United States Patent [19]

Yamada et al.

[11] Patent Number: 5,223,598
[45] Date of Patent: Jun. 29, 1993

[54] PLURAL LIQUID PACK TYPE, HEAT-CURABLE POLYISOCYANATE-POLYOL-POLYEPOXY RESIN COMPOSITION AND PROCESS FOR PRODUCING A SHAPED RESIN ARTICLE THEREFROM

[75] Inventors: Takeyoshi Yamada; Hiroyuki Umetani, both of Iwakuni, Japan

[73] Assignee: Teijin Limited, Osaka, Japan

[21] Appl. No.: 942,104

[22] Filed: Sep. 8, 1992

Related U.S. Application Data

[63] Continuation of Ser. No. 732,506, Jul. 18, 1991, abandoned.

[30] Foreign Application Priority Data

Jul. 30, 1990 [JP] Japan .................................. 2-199202
May 10, 1991 [JP] Japan .................................. 3-133254

[51] Int. Cl.$^5$ ............................................. C08G 18/04
[52] U.S. Cl. .................................... 528/48; 528/49; 528/52; 528/53; 528/54; 528/55; 528/57; 528/58; 528/60; 528/65; 528/66; 528/73
[58] Field of Search ................... 528/48, 49, 52, 53, 528/54, 55, 57, 58, 60, 65, 66, 73

[56] References Cited

U.S. PATENT DOCUMENTS

| | | | |
|---|---|---|---|
| 4,220,731 | 9/1980 | Zuppinger | 528/73 |
| 4,613,660 | 9/1986 | Goel et al. | 528/73 |
| 4,728,676 | 3/1988 | Müller et al. | 521/107 |
| 5,075,405 | 12/1991 | Atchekzai et al. | 528/52 |

FOREIGN PATENT DOCUMENTS

| | | |
|---|---|---|
| 2001358 | 4/1990 | Canada . |
| 0232540 | 8/1987 | European Pat. Off. . |
| 0256162 | 2/1988 | European Pat. Off. . |
| 0368031 | 10/1989 | European Pat. Off. . |
| 0359222 | 3/1990 | European Pat. Off. . |
| 3001637 | 7/1981 | Fed. Rep. of Germany . |

OTHER PUBLICATIONS

Chemical Abstracts, vol. 108, No. 2, abstract No. 71745, Jan. 1988 JP-A-6 281,471.

*Primary Examiner*—Maurice J. Welsh
*Attorney, Agent, or Firm*—Burgess, Ryan & Wayne

[57] ABSTRACT

A plural liquid pack type resin composition useful for producing a shaped resin article having an enhanced heat resistance, mechanical strength and machinability, comprises a first resinous individual component (A) comprising a polyisocyanate compound and a second resinous individual component (B) comprising a mixture of a polyol compound with a polyepoxy compound and a curing agent, or an individual sub-component (i) comprising a mixture of a polyol compound and a polyepoxy compounds and another individual sub-component (ii) comprising a mixture of the polyol compound with a curing agent, in which composition the polyol compound is contained in an amount of 10 to 40 equivalents of the hydroxyl group, the polyepoxy compound is contained in an amount of 5 to 20 equivalents of the epoxy group, and the total equivalent amount of the hydroxyl group and the epoxy groups is 15 to 45 equivalents per 100 equivalents of the isocyanate groups of the polyisocyanate compounds.

14 Claims, No Drawings

PLURAL LIQUID PACK TYPE, HEAT-CURABLE POLYISOCYANATE-POLYOL-POLYEPOXY RESIN COMPOSITION AND PROCESS FOR PRODUCING A SHAPED RESIN ARTICLE THEREFROM

This application is a continuation of application Ser. No. 732,506, filed Jul. 18, 1991, now abandoned.

BACKGROUND OF THE INVENTION

1) Field of the Invention

The present invention relates to a plural liquid pack type, heat-curable polyisocyanate-polyolpolyepoxy resin composition and a process for producing a shaped resinous article from same. More particularly, the present invention relates to a plural liquid pack type, heat-curable polyisocyanate-polyol-polyepoxy resin composition having an excellent storage stability, handling property and molding property and useful for producing a shaped resinous article having a superior heat resistance, chemical resistance and mechanical strength, especially impact strength and machinability, and a process for producing a shaped resinous article therefrom at a high reproducibility and stability.

2) Description of the Related Art

Due to recent technological developments, various new types of resinous materials having an excellent heat resistance, mechanical properties, and moldability are now in demand.

Among these new resinous materials, the most noticeable is a reaction-molding type resin comprising a reactive monomer or oligomer. This reaction-molding type resinous material refers to a heat-curable resinous material having a relatively low viscosity, preferably being in the state of a liquid at room temperature, and capable of being simultaneously molded and cured (hardened or polymerized).

The heat curable resinous materials include polyurethane resins, and vinyl ester resins. Some of the above epoxy resins, and unsaturated polyester resinous materials which have been commercially produced and marketed.

Nevertheless, these conventional heat-curable resinous materials have some disadvantages. For example, the conventional polyurethane resins usually have a low heat resistance and the conventional unsaturated polyester resins and epoxy resins are too hard and fragile, although they have a higher heat resistance than that of the conventional polyurethane resins.

Japanese Examined Patent Publication No. 44-16669 discloses an improvement in the heat resistance of the conventional polyurethane resins, obtained by introducing an isocyanurate ring structure derived from a trimerization of an isocyanate compound thereinto. This improvement has long been known and practiced in the polyurethane resin industry, but is effective only for increasing a heat-distortion temperature of a heat-cured polyurethane resin by about 20° C. to 30° C., and thus the resultant heat-cured polyurethane resin exhibits a heat-distortion temperature of not higher than about 150° C. to about 160° C.

A well known heat-curable resin, produced by using, as a component, a polyisocyanate compound, is a heat curable resin having an oxazolidone ring structure derived from a reaction of an isocyanate group in a polyisocyanate compound with an epoxy group in an epoxy compound.

Japanese Unexamined Patent Publication No. 62-62879 disclosed a heat curable resin having the isocyanurate ring structure derived from a trimerization of an isocyanate compound together with the abovementioned oxazolidone ring structure.

This heat curable resin is advantageous in having an enhanced heat resistance, but is disadvantageous in having a high fragility and a poor-impact strength. This high fragility and poor impact strength are common disadvantages of the conventional heat-curable resins.

To eliminate these disadvantages, an addition of an elastic material, for example, a rubber material, to the conventional heat-curable resins has been attempted, but this addition of the elastic material does not effectively enhance the impact strength to a high degree. Also, an increase in the amount of the added elastic material causes the resultant product to exhibit a deterioration in properties other than the impact strength, for example, a lowered heat-distortion temperature.

The inventors of the present invention attempted to provide a liquid resinous composition comprising a polyisocyanate, a polyepoxy compound, a polyol compound and a curing agent. In this attempt, the inventors found that the resultant resinous composition is unstable due to a high reactivity thereof, and thus is easily cured or polymerized even at room temperature, and the viscosity of the resinous composition is increased and a gel-like or insoluble substance is formed. Accordingly, when a shaped resin article is produced from the resinous composition, the reproducibility of the properties of the shaped resin article is poor, and the molding procedure becomes unstable.

Japanese Unexamined Patent Publication No. 59-221321 discloses a process for producing a shaped resinous article from a resin composition. This resin composition comprises a first individual liquid resinous component comprising a liquid mixture of a polyisocyanate compound and an epoxy compound and a second individual liquid component comprising a liquid mixture of a specific curing agent, such as an aziridine compound with a tertiary amine compound, and optionally, an active hydrogen compound. In this process, the first and second individual liquid components are mixed, and the resultant mixture is then immediately subjected to a molding procedure, for example, a pour-molding or injection molding procedure.

The inventors of the present invention studied in detail the above-mentioned process and found that, in the first individual component, the polyisocyanate compound gradually reacts with the epoxy compound and a gel-like substance and an insoluble substance is formed in the first component with a lapse of time. When the epoxy compound has two or more epoxy groups, the above-mentioned phenomenon is significant, and thus the first individual component cannot be stably stored over a long time, and accordingly, cannot be practically utilized.

SUMMARY OF THE INVENTION

An object of the present invention is to provide a plural liquid pack type, heat-curable polyisocyanate-polyol-polyepoxy resin composition having a high storage stability over a long time and capable of forming a shaped resinous article having an excellent heat resistance and a superior impact strength, and a process for producing a shaped resinous article therefrom at a high stability and a satisfactory reproducibility.

The above-mentioned object can be attained by the plural liquid pack type, heat curable polyisocyanate-polyol-polyepoxy resin composition of the present invention, and a process of the present invention for producing a shaped resinous article from the above-mentioned resin composition.

The plural liquid pack type, heat-curable polyisocyanate-polyol-polyepoxy resin composition of the present invention comprises:

(A) a first resinous individual component comprising
  (a) at least one polyisocyanate compound having two or more isocyanate groups;

(B) a second resinous individual component comprising (b) at least one polyol compound having two or more hydroxyl groups, (c) at least one polyepoxy compound having two or more epoxy groups, and (d) a curing agent, the hydroxyl group of the polyol compound (b) in the second individual component (B) being present in an amount of 10 to 40 equivalents thereof per 100 equivalents of the isocyanate groups of the polyisocyanate compound (a) in the first individual component (A), the epoxy groups of the polyepoxy compound (c) in the second individual component (B) being present in an amount of 5 to 20 equivalents thereof per 100 isocyanate equivalents as mentioned above, and the sum of the equivalent amount of the hydroxyl groups of the polyol compound (b) and the equivalent amount of the epoxy groups of the polyepoxy compound (c) in the second individual component (B) being in the range of from 15 to 45 equivalents per 100 isocyanate equivalent as mentioned above.

In an embodiment of the resin composition of the present invention, the second individual component (B) comprises a homogeneous mixture of the polyol compound (b), the polyepoxy compound (c), and the curing agent (d).

In another embodiment of the resin composition of the present invention, the second individual component (B) is composed of
  (i) a resinous individual sub-component comprising a mixture of a portion in amount of the polyol compound (b) with the entire amount of the polyepoxy compound (c), and
  (ii) another resinous individual sub-component comprising a mixture of the remaining portion in amount of the polyol compound (b) with the entire amount of the curing agent (d).

The process of the present invention for producing a shaped resinous article from the plural liquid pack-type, heat curable polyisocyanate-polyol-polyepoxy resin composition as mentioned above comprises the steps of: mixing the first individual component (A) with the second individual component (B) to provide a liquid resinous mixture; immediately feeding the liquid resinous mixture into a mold; heat curing the liquid resinous mixture in the mold; and taking the resultant shaped resinous article out of the mold.

DESCRIPTION OF THE PREFERRED EMBODIMENTS

The resin composition of the present invention comprises (A) a first resinous individual component comprising (a) at least one polyisocyanate compound having two or more isocyanate groups; and (B) a second resinous individual component comprising (b) at least one polyol compound having two or more hydroxyl groups, (c) at least one polyepoxy compound having two or more epoxy groups, and (d) a curing agent.

In an embodiment of the resin composition of the present invention, the polyol compound, the polyepoxy compound and the curing agent in the second resinous individual component (B) are uniformly mixed altogether to form a liquid mixture.

In another embodiment of the resin composition of the present invention, the second resinous individual component (B) is composed of (i) a resinous individual sub-component comprising a mixture of a portion of the polyol compound (b) with the polyepoxy compound (c), and (ii) a resinous individual sub-component comprising a mixture of the remaining portion of the polyol compound (b) with the curing agent (d).

In the resin composition of the present invention, the hydroxyl groups of the polyol compound (b) in the second resinous individual component (B) are in an amount of 10 to 40 equivalents thereof per 100 equivalents of the isocyanate group of the polyisocyanate compound (a) in the first resinous individual component (A). Also, the epoxy groups of the polyepoxy compound (C) in the second resinous individual component (B) are in an amount of 5 to 20 equivalents thereof per 100 isocyanate equivalents as mentioned above. Further, the sum of the equivalent amount of the hydroxy groups and the equivalent amount of the epoxy groups in the second resinous individual component (B) is in the range of from 15 to 45 equivalents per 100 isocyanate equivalents as mentioned above.

The first resinous individual component (A) can be easily mixed with the second resinous individual component (B) which may be in the form of a single liquid mixture or composed of two resinous individual sub-components (i) and (ii) as mentioned above, to provide a liquid resinous mixture to be molded.

The isocyanate compound (a) usable for the present invention has two or more isocyanate groups and can be selected from aliphatic, cycloaliphatic and aromatic polyisocyanate compounds.

The aliphatic polyisocyanate compounds usable for the present invention include, for example, hexamethylene diisocyanate, and 2,2,4- and 2,4,4-trimethylhexamethylene-1,6-diisocyanates.

The cycloaliphatic polyisocyanate compounds include, for example, isophorone-diisocyanate, 4,4'-dicyclohexylmethane diisocyanate, and hydrogenated meta- and paraxylylene diisocyanates.

The aromatic polyisocyanate compounds include, for example, 2,4- and 2,6-tolylene diisocyanates, 4,4'-diphenylmethane diisocyanate, 3,4'- and 4,4'-diphenylether diisocyanates, 1,5-'-naphthalene diisocyanate, meta- and para-xylylene diisocyanate, polyphenylenepolymethylene polyisocyanates, carbodiimide-modified and polyol-modified 4,4'-diphenylmethane diisocyanate, and terpolymers of diisocyanate compounds having at least one isocyanurate ring structure.

The polyphenylenepolymethylene polyisocyanates are produced by converting a polyamine compound obtained by a condensation reaction of aniline with formaldehyde to a polyisocyanate compound by a reaction with phosgene.

The polyisocyanate compound having an isocyanurate ring structure can be produced by a trimerization of a polyisocyanate compound, for example, tolylene diisocyanate.

The first individual component (A) comprises only one polyisocyanate compound or a mixture of two or more polyisocyanate compounds. The first individual component (A) must be in the state of a liquid at least at the stage of being mixed with the second individual component (B), preferably at room temperature. Preferably, the first individual component comprises at least one member selected from the carbodiimide-modified and polyol-modified 4,4'-diphenylmethane diisocyanates, mixtures of 2,4-tolylene diisocyanate with 2,6-tolylene diisocyanate, and polyphenylenepolymethylene polyisocyanates which are in the state of a liquid having a low viscosity at room temperature.

The polyol compound (b) usable for the present invention is provided with two or more hydroxyl groups.

The polyol compound (b) can be selected from the group consisting of polymeric polyol compounds such as polyetherpolyol compounds, for example, polyethylene glycol, polypropylene glycol, polytetramethylene glycol addition products of propylene glycol with ethylene oxide attached to the terminals thereof, addition products of a member selected from glycerol, pentaerythritol, sorbitol, trimethylolpropane, bisphenol A, and N-substituted diethanolamines with at least one member selected from ethylene oxide and propylene oxide attached to the terminals of the above-mentioned polyol compounds; polyesterpolyol compounds, for example, polyadipate polyol compounds; polycaprolactone polyol compounds polycarbonate polyol compounds, polyetherpolyesterpolyol compounds and polyesteramide polyol compounds, and monomeric polyol compounds such as alkylene glycols, for example, ethylene glycol, propylene glycol, 1,3-butane diol dipropylene glycol, and 1,4- and 1,5-hexane diols; glycerol, pentaerythritol, sorbitol, trimethylpropane, N-substituted diethanolamine, cyclohexane diol, cyclohexane dimethanol, and bisphenol A. The N-substituted diethanolamines include N-mono-aromatic, cycloaliphatic and aliphatic radical-substituted diethanolamines. Also, the polyol compounds (b) usable for the present invention include modified polybutadiene, butadiene-styrene copolymers and butadiene-acrylonitrile copolymers each having two or more terminal hydroxyl groups.

The second individual component (B) may contain only one polyol compound, but preferably contains a mixture of two or more polyol compounds different from each other. The mixture of the polyol compounds effectively provides a shaped resin article having a well-balanced heat resistance and impact strength.

Among the above-mentioned polyol compounds, the polymeric polyol compounds having a molecular weight of about 300 to about 7000 and contributing to an increase in the impact strength of the resultant shaped resin article, and a mixture of at least one polyester polyol or polyether polyol compound with at least one polyol compound which is the same as or different from the compound mentioned above, effectively provide a shaped resin article having a satisfactory heat resistance and water resistance.

Preferably, the polyol compound is in the state of a liquid at room temperature. The liquid polyol compound effectively enhances the molding property of the resultant resinous mixture to be molded.

The polyepoxy compound (c) usable for the present invention has two or more epoxy groups, and preferably, is selected from the group consisting of diepoxy compounds, for example, bisphenol A diglycidylether, bisphenol F diglycidylether, bisphenol S diglycidylether, resorcinol diglycidylether, hexahydrobisphenol A diglycidylether, polypropyleneglycol diglycidylether, neopentylglycol diglycidylether, and diglycidylphthalate; tri- or more-epoxy compounds, for example, triglycidylisocyanurate compounds; tetraglycidyl compounds of the formula (1):

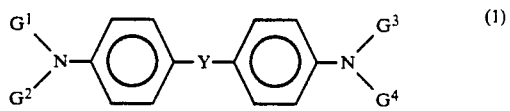

wherein Y represents a member selected from the group consisting of —CH$_2$—, —C(CH$_3$)$_2$—, —O—, —SO$_2$—, —S—, and —C(CF$_3$)$_2$— radicals and G$^1$, G$^2$, G$^3$ and G$^4$ respectively and independently from each other represent a member selected from the group consisting of the radicals of the formulae:

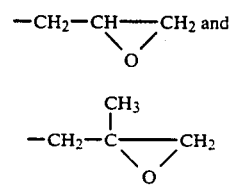

and other polyepoxy compounds, for example, phenol novolak polyglycidylethers and cresol novolak polyglycidylethers.

Preferably, the polyepoxy compound (c) is substantially in the state of a liquid at room temperature.

Preferable polyepoxy compounds for the present invention are bisphenol A diglycidylether and bisphenol F diglycidylether which are in the state of a liquid having a low viscosity at room temperature.

Also, the phenol and cresol novolak polyglycidylethers effectively enhance the heat-resistance of the resultant shaped resin article.

Further, the tetraglycidyl compounds of the formula (1) are very useful in the obtaining of a shaped resin article having an excellent heat resistance and a superior impact strength.

The tetraglycidyl compounds of the formula (1) are preferably selected from N,N,N',N'-tetraglycidylmethylenedianiline, N,N,N',N'-tetraglycidyletherdianiline, N,N,N',N'-tetraglycidylsulfodianiline and N,N,N',N'-tetraglycidylsulfidedianiline.

The second individual component (B) may contain only one polyepoxy compound, or a mixture of two or more different polyepoxy compounds.

In the plural liquid pack type, heat curable polyisocyanate-polyol-polyepoxy resin composition of the present invention, with respect to 100 equivalents of the isocyanate groups of the polyisocyanate compound (a) in the first individual component (A), the second individual component (B) contains the hydroxyl groups of the polyol compound (b) in an equivalent amount of 10 to 40 equivalents, preferably 15 to 30 equivalents, and the epoxy groups of the polyepoxy compound (c) in an equivalent amount of 5 to 20 equivalents, preferably 7 to 18 equivalents, the sum of the equivalent amount of the hydroxyl groups and the equivalent amounts of the epoxy groups being in a range of from 15 to 45 equivalent, preferably 15 to 35 equivalents.

The polyol compound (b) reacts with the polyisocyanate compounds (a) to produce a polyurethane. Accordingly, when a liquid resinous mixture of the first and second individual components (A) and (B) is heat-cured, the resultant cured product includes a polyurethane. The polyurethane effectively enhances the impact strength of the resultant cured resin article, and therefore, the impact strength of the cured resin article is increased with an increase in a content of the polyurethane in the cured resin article. The increase in the content of the polyurethane, however, causes a lowering of the heat resistance of the cured resin article. Therefore, to provide a proper balance of the heat resistance and the impact strength of the cured resin article, the content of the polyurethane must be restricted to a specific range.

In the resin composition of the present invention, the content of the polyol compound in the second individual component (B) must be limited to the level corresponding to the equivalent amount of the hydroxyl groups thereof of 10 to 40 equivalents per 100 isocyanate equivalents.

When the equivalent amount of the hydroxyl groups of the polyol compound in the second individual component (A) is less than 10 equivalent per 100 isocyanate equivalents, the resultant shaped resinous article exhibits an unsatisfactory impact strength.

When the equivalent amount of the hydroxyl groups is more than 40 equivalents, the resultant shaped resinous article exhibits an unsatisfactory heat resistance.

The polyepoxy compound (c) reacts with the polyisocyanate compound (a) to produce an oxazolidone ring structure-containing polymer. This oxazolidone ring structure effectively enhances the heat resistance of the resultant polymer.

Also, the reaction of the epoxy groups with the isocyanate group is a linear chain-forming reaction but not a network-forming reaction. Therefore, the formation of the oxazolidone ring structure effectively enhances both the heat resistance and the impact strength of the resultant cured resin article.

Nevertheless, the oxazolidone ring structure-forming reaction can be effected only at a temperature higher than that of the polyurethane-forming reaction or the isocyanurate ring-forming reaction which is a trimerization reaction of the isocyanate compound. Therefore, in the curing procedure in which the temperature of the liquid resinous mixture is raised, the oxazolidone ring structure-forming reaction is effected at a stage later than the stages of the other reactions.

Accordingly, if the polyepoxy compound is contained in too large a content in the reaction system, the resultant reaction product mixture contains a large amount of non-reacted polyepoxy compound, and thus exhibits an unsatisfactory heat resistance, for example, an undesirably low heat-distortion temperature.

Therefore, the content of the epoxy group of the polyepoxy compound in the second individual component (B) must be restricted to a level corresponding to 5 to 20 equivalents, preferably 7 to 18 equivalents per 100 isocyanate equivalent.

When the equivalent amount of the epoxy groups of the polyepoxy compound (c) in the second individual component (B) is less than 5 equivalent per 100 isocyanate equivalents, the resultant cured resin article exhibits an unsatisfactory impact strength. Also, when the equivalent amount of the epoxy groups is more than 20 equivalents, the resultant cured resin article exhibits an unsatisfactory heat resistance.

In the second individual component (B), the sum of the equivalent amounts of the hydroxyl groups and the epoxy groups is limited to a level of from 15 to 45 equivalents, preferably 15 to 35 equivalents, per 100 isocyanate equivalents. When the above-mentioned sum is more than 45 equivalents, the trimerization reaction of the isocyanate groups (the formation of the heat-resistive isocyanurate ring structure) is hindered, and thus the resultant cured resin article exhibits an unsatisfactory heat resistance. When the above-mentioned sum is less than 15 equivalents, the trimerization reaction of the isocyanate group is excessively promoted, and thus the resultant cured resin has an excessively increased cross-linkage and the resultant cured resin article exhibits an increased fragility, although the heat resistance thereof is high.

The curing agent comprises at least one compound which effectively promotes, as a catalyst, the trimerization of the polyisocyanate compound (a) and the formation of the oxazolidone ring structure from the polyisocyanate compound (a) and the polyepoxy compound (c).

The compound usable for the curing agent of the present invention is preferably selected from the group comprising tertiary amines, for example, triethylamine, tripropylamine, tributylamine, triethylenediamine, N-methyl-morpholine, N,N'-dimethylpiperazine, N,N',N''-tris(dialkylaminoalkyl) hexahydro-S-triazine, triethylenemelamine, 1,4-di-azabicyclo-2,2,2-octane, N,N-dimethylbenzylamine, 2,4,6-tris (dimethylaminomethyl) phenol, and N,N',N''-tris(dimethylaminopropyl) hexahydro-S-triazine; organic metal compounds, for example, sodium methoxide, lead naphthenate and a potassium-chelate compound of salicylaldehyde; and quaternary ammonium compounds of the formula (2):

(2)

wherein $R^1$, $R^2$, $R^3$ and $R^4$ respectively and independently from each other represent a member selected from the group consisting of aliphatic hydrocarbon radicals having 1 to 20 carbon atoms, and cycloaliphatic and aromatic hydrocarbon radicals having 6 to 12 carbon atoms, the sum of the carbon atoms in the $R^1$, $R^2$, $R^3$ and $R^4$ groups being 12 or more, X represents a halogen atom.

In the formula (2), $R^1$, $R^2$, $R^3$ and $R^4$ preferably represent a member selected from methyl, ethyl, propyl, butyl, decyl, tetradecyl, benzyl, cyclohexyl and phenyl radicals.

When the total number of the carbon atoms in the $R^1$, $R^2$, $R^3$ and $R^4$ radicals is less than 12, the resultant quaternary ammonium compound exhibits a poor solubility in the resinous liquid mixture, and thus the resultant cured resin article has a unsatisfactory, uneven quality. Therefore, the total number of the carbon atoms of the $R^1$, $R^2$, $R^3$ and $R^4$ radicals must be 12 or more. The $R^1$, $R^2$, $R^3$ and $R^4$ are preferably the same as each other, but all or some thereof may be different from each other.

In the formula (2), X represents a halogen atoms, i.e., a member selected from iodine, bromine, chlorine and fluorine atoms. Preferably, X represents a bromine or chlorine atom, which causes rate for the resinous liquid mixture.

The quaternary ammonium compound of the formula (2) is preferably selected from the group consisting of tetra-n-butyl ammonium bromide, tetra-n-butyl ammonium chloride, n-tetradecyltrimethyl ammonium chloride and benzalkonium chloride.

When the resinous composition of the present invention is used for a resin transfer molding (RTM) process or a structural reaction injection molding process (S-RIM), the resinous liquid mixture must be maintained in a non-reacted condition for a certain time, until the curing reaction of the resinous liquid mixture is started. Accordingly, the curing agent preferably comprises a quaternary ammonium compound of the formula (2) in which the $R^1$, $R^2$, $R^3$ and $R^4$ are respectively in alkyl radical having 4 to 5 carbon atoms, for example, tetra-n-butyl ammonium bromide.

The curing effect of the quaternary ammonium compound of the formula (2) can be enhanced by a mixture thereof with a tin compound.

The tin compound usable for the mixed curing agent can be selected from inorganic tin compounds, for example, tin (II) chloride and tin (IV) chloride; and organic tin compounds, for example, di-n-butyltin dilaurate, di-n-butyltin diacetate, tributyltin acetate, tetra-n-butyl tin. Among the above-mentioned tin compounds, the di-n-butyltin dilaurate and di-n-butyltin diacetate can be easily handled, and thus are most suitable for the present invention.

The curing agent (d) in the second individual component (B) is preferably present in an amount of 0.001 to 10 parts by weight, more preferably 0.005 to 5 parts by weight, based on 100 parts by total weight of the polyisocyanate compound (a), the polyol compound (b) and the polyepoxy compound (c).

In the curing agent (d), quaternary ammonium compound of the formula (2) is preferably present in an amount of 0.3 to 3 parts, more preferably 0.35 to 1 part, based on 100 parts by the total weight of the polyisocyanate, polyol and polyepoxy compounds. In this curing agent, the tin compound to be mixed with the quaternary ammonium compound is preferably present in an amount of 0.001 to 0.25 parts, more preferably 0.005 to 0.2 part, based on 100 parts by the total weight of the polyisocyanate, polyol and polyepoxy compounds.

The larger the content of the curing agent, the higher the curing rate of the resultant resinous liquid mixture, but sometimes a large amount of the curing agent will cause a foaming of the resultant resinous liquid mixture.

The addition of the tin compound to the quaternary ammonium compound effectively causes the resultant cured resin article to exhibit an increased heat distortion temperature (HDT) and an enhanced toughness or tenacity, but when the tin compound is contained in an excessively large amount in the curing agent, the resultant resinous liquid mixture exhibits an excessively high curing rate and the resultant cured resin article exhibits a lower heat-distortion temperature.

The curing agent may comprise a mixture of two or more of the above-mentioned catalystic compounds, and preferably, the curing agent comprises a mixture of two or more of the above-mentioned tertiary amine compounds, a mixture of two or more the above-mentioned quaternary ammonium compounds/or a mixture of one or more of the above-mentioned tertiary amine compound with one or more of the above-mentioned quaternary ammonium compounds. This type of curing agent enables an easy control of the reactivity of the resin composition of the present invention.

Where the curing agent comprises the mixture of one or more of the tertiary amine compounds with one or more of the quaternary ammonium compounds, the tertiary amine compounds are employed preferably in an amount of 0.001 to 0.20 parts by weight, more preferably 0.001 to 0.15 parts by weight, based on 100 parts by total weight of the polyisocyonate compound (a), the polyol compound (b) and the polyepoxy compound (c). Also, preferably the quaternary ammonium compounds are employed in an amount of 0.3 to 3 parts, more preferably 0.35 to 1 part by weight, based on 100 parts by the total weight of the polyisocyanate, polyol and polyepoxy compounds.

When the tertiary amine compounds and the quaternary ammonium compounds are employed in the above-mentioned amounts, the resultant resin composition exhibits an enhanced stability when stored and superior physical properties. This type of curing agent preferably contains the above-mentioned tin compound, for the same purpose as mentioned above.

As mentioned above, when a polyisocyanate compound is mixed with a polyepoxy compound, and the mixture is left to stand, a jelly-like substance and/or an insoluble substance is frequently generated in the mixture, even in the absence of a curing agent. The creation of the jelly-like substance is often found when a commercially available polyepoxy compound is used. The polyepoxy compound is a prepolymeric compound but not a monomeric compound, and contains at least one hydroxyl group attached to a polyepoxy molecule. Accordingly, it is assumed that, when the hydroxyl group-containing polyepoxy compound is mixed with a polyisocyanate compound, the hydroxyl group gradually reacts with the isocyanate groups to produce the jelly-like substance.

It has been found, however, that when a polyepoxy compound free from the hydroxyl group is mixed with the polyisocyanate compound, a precipitate or a gel-like substance is created in the resultant mixture, even in the absence of a curing agent. With regard to this phenomenon, it is assumed that the isocyanate group, which is highly reactive, of the polyisocyanate compound gradually reacts with the epoxy groups of the polyepoxy compound even in the absence of the curing agent.

Also, when a polyisocyanate compound is mixed with a polyol compound in the absence of a curing agent, and the mixture is left to stand, these compounds are reacted with each other to create a jelly or gel-like substance or a precipitate. Accordingly, the mixture cannot be stably stored for a long time, even in the absence of the curing agent.

Nevertheless, the resin composition of the present invention can be stored over a long time without a creation of a jelly or gel-like substance and a precipitate, and therefore, the resin composition of the present invention is useful for producing a shaped resin article having an excellent heat resistance and a superior impact strength, at a high industrial reproducibility and a high industrial productivity.

In the resin composition of the present invention, the first and second individual components (A) and (B) are stored separately from each other, before the production of the shaped resin article, and when the shaped resin article is produced, the first and second individual components (A) and (B) are mixed together to provide a resinous liquid mixture.

When the second individual component (B) is composed of a individual sub-component (i) comprising a mixture of a portion of the polyol compound (b) with the polyepoxy compound (c) and another individual sub-component (ii) comprising a mixture of the remaining portion of the polyol compound (b) with the curing agent, the sub-components (i) and (ii) are stored separately from each other, and are mixed together when used.

The first individual component (A) can be mixed with the individual sub-components (i) and (ii) altogether in one mixing operation.

Preferably, the individual sub-components (i) and (ii) are mixed with each other, and the resultant mixture (corresponding to the second individual component (B)) is further mixed with the first individual component (A).

In the process of the present invention, the liquid resinous mixture of the first resinous individual component (A) with the second resinous individual component (B) or with the individual sub-components (i) and (ii) is fed into a mold immediately after the preparation of the liquid resinous mixture, the liquid resinous mixture in the mold is fully or partially heat-cured, and the resultant shaped resinous article is taken out of the mold.

Where the second individual component (B) comprises a mixture of the polyol compound (b), with the polyepoxy compound (c) and the curing agent (d), and the curing agent (d) comprises a tertiary amine compound, a ring opening polymerization of the polyepoxy compound may occur due to the catalytic activity of the tertiary amine compound, and a formation of a certain addition-reaction product of the tertiary amine with the epoxy group of the polyepoxy compound also may occur, which addition reaction product has an enhanced catalytic activity for a trimerization of the polyisocyanate compound. Accordingly, the type and content of the tertiary amine compound in the second individual component (B) must be carefully controlled. A most preferable tertiary amine compound, which can maintain the second individual component (B) in a stable condition for a long time, is N,N-dimethylbenzylamine. This compound is preferably employed in an amount of 0.05 to 0.15 parts by weight based on 100 parts by the total weight of the polyisocyanate, polyol and polyepoxy compounds (a), (b) and (c).

When the second individual component (B) is composed of an individual sub-component (i) and another individual sub-component (ii) which contains a curing agent and is free from the polyepoxy component, these sub-components (i) and (ii) can be very stably stored over a long time even if the curing agent contains a tertiary amine compound. Namely, in the individual sub-component (ii), the tertiary amine compound is not activated by the polyepoxy compound. Therefore, there is no limitation of the type and amount of the tertiary amine compound in the individual sub-component (ii). Also, since the tertiary amine compound, which is used in a small amount, is mixed with a certain amount of the polyol compound, the individual sub-component (ii) can be easily measured and handled.

Even where the tertiary amine compound is used, if the amount of the tertiary amine compound is reduced and the quaternary ammonium compound and the tin compound are used together with the tertiary amine compound, the second individual component (B) can be used in a single liquid mixture form, without separating into the individual sub-components (i) and (ii).

The procedure of mixing the first individual component (A) with the second individual component (B) or the individual sub-components (i) and (ii) can be carried out by using a conventional liquid mixing method, for example, an impingement mixing method, static mixing method or dynamic mixing method.

In the process of the present invention, the liquid resinous mixture is fed into a mold, and subjected to a heat-curing step in the mold. The curing temperature is set in consideration of the types and contents of the polyisocyanate compound (a), the polyol compound (b), the polyepoxy compound (c) and the curing agent (d), and preferably is in the range of from about 10° C. to about 280° C.

To complete the ring-forming reactions, preferably the heat curing step has at least one stage at which the heat-curing temperature is at a level of from 150° C. to 280° C, more preferably from 150° C. to 240° C., still more preferably from 150° C. to 200° C.

The heat-curing step having at least one heat-curing stage at a temperature of 150° C. to 280° C. can be applied to the liquid resinous mixture fed in the mold.

Alternatively, the liquid resinous mixture in the mold is pre-heat cured at a temperature lower than 150° C., preferably from about 10° C. to 145° C., and the pre-heat cured article is taken out of the mold and post-heat cured at a temperature of from 150° C. to 280° C. This mode of the heat-curing step effectively prevents an undesirable formation of pores or voids in the resultant cured article.

The heat curing time is not limited to a specific range, as long as the heat curing procedure can be completed, and is variable depending on the types, contents of the compounds (a), (b), and (c) and the curing agent (d) and the heat curing temperature. Usually, the total heat curing time is in the range of from 1 minute to 24 hours, preferably from 5 minutes to 10 hours, more preferably from 10 minutes to 6 hours.

The heat-curing procedure can be effected in the ambient air atmosphere, preferably in an inert gas atmosphere containing at least one member selected from nitrogen, argon and helium.

In the process of the present invention, the molding step can be carried out by a conventional molding method, for example, a compression molding method, transfer molding method, vacuum molding method, centrifugal molding method, injection molding method, reaction injection molding method (RIM) or structural reaction injection molding method (S-RIM). The transfer molding method, vacuum molding method, centrifugal molding method and S-RIM method are preferably utilized for the process of the present invention.

In the process of the present invention, the liquid resinous mixture is optionally mixed with at least one member selected from reinforcing fiber materials comprising thermoplastic fibers, carbon fibers, aramid fibers and/or glass fibers, fillers, pigments, coloring materials, antioxidants, ultraviolet ray-absorbants and releasing agents.

For example, a reinforcing fiber material in the form of a woven fabric or non-woven mat, is placed in a mold and then a liquid resinous mixture is fed into the mold. In this case, the liquid resinous mixture is heat cured in the presence of the reinforcing fiber material impregnated therewith, and thus the resultant shaped resin article is reinforced by the fiber material contained therein.

The plural liquid pack type, heat curable polyisocyanate-polyol-polyepoxy resin composition of the present invention exhibits a high storage stability and is useful for producing a shaped resin article having an excellent heat resistance, chemical resistance and mechanical strength, and a satisfactory machinability, at a high reproducibility and productivity.

Especially, when a curing agent consisting of a specific quaternary ammonium salt compound in combination with a tin compound is used, the resultant resin composition is useful for forming a shaped resin article having a large thickness, for example, 20 cm or more, without scorching a center portion of the shaped article black.

The shaped resin article produced from the resin composition of the present invention can be easily cut or drilled by using a cutting or drilling machine for metal materials.

Accordingly, the process of the present invention is useful for producing various machine parts, for example, gears, rollers, and packing materials; structural materials and parts for automobiles and aircraft; electronic device parts, for example, molded insulating materials, sealants for semiconductor devices; parts for furniture, for example, chairs; castors of trucks or cars, sports goods; parts of buildings; mold-forming materials, sample-forming materials; and prototypes.

EXAMPLES

The present invention will be further explained by the following examples.

In the examples, the following tests were applied to the resultant shaped resin articles.

(1) Heat distortion temperature (HDT)

The heat distortion temperature was measured by an HDT tester, available under the trademark of HDT Tester, Model S3-MEH, from Toyo Seiki Seisakusho, under a load of 18.5 kg/cm$^2$.

(2) Notched Izod (N.I.) impact strength

This was measured in accordance with Japanese Industrial Standard (JIS) K 6911. The specimen had a thickness of 3 mm.

(3) Flexural strength and flexural modulus

These properties were measured in accordance with ASTM D-790.

(4) Molding shrinkage

The molding shrinkage was calculated from the following equation:

$$\text{Molding shrinkage (\%)} = \left(1 - \frac{A}{a}\right) \times 100$$

wherein A represents a density of a starting liquid resinous mixture to be molded and a represents a density of a resultant shaped resin article.

EXAMPLE 1

A first individual component (A) was prepared from a carbodiimide-modified 4,4'-diphenylmethane diisocyanate alone having an isocyanate equivalent amount of $6.90 \times 10^{-3}$ equivalents/g.

A second individual component (B) was prepared by mixing 80 parts by weight of a mixture of two polyetherpolyol compounds having different molecular weights and a total hydroxyl equivalent amount of $3.70 \times 10^{-3}$ equivalents/g with 20 parts by weight of a polyepoxy compound available under the trademark of EPICOAT 828, from YUKA SHELL K.K., and having an epoxy equivalent amount of $5.21 \times 10^{-3}$ equivalents/g and 0.24 part by weight of a curing agent consisting of N,N-dimethyl-benzylamine.

At the initial stage, the resultant second liquid resinous individual component (B) had a viscosity of 402 cps at a temperature of 30° C.

After storage for 30 days at room temperature, the second liquid resinous individual component (B) exhibited a slightly increased viscosity of 518 cps at a temperature of 30° C.

The stored component (B) was in the state of a clear liquid and did not contain a precipitate or a gel-like substance.

A liquid resinous mixture was prepared by mixing 200 parts by weight of the first individual component (A) with 100 parts by weight of the second individual component (B) in a static mixing system, and poured into a mold heated at a temperature of 140° C.

The liquid resinous mixture was pre-heat cured in the mold at a temperature of 140° C. for 30 minutes. The pre-heat cured, shaped resin article was taken out of the mold and post-heat cured at a temperature of 180° C. for 5 hours.

The resultant product was a reddish brown-colored transparent resin sheet having a thickness of 3 mm.

The resin sheet was subjected to the above-mentioned tests.

The test results were as follows.

| | |
|---|---|
| Flexural strength | 14.0 kg/mm$^2$ |
| Flexural modulus | 410 kg/mm$^2$ |
| Heat distortion temperature (HDT) | 235° C. |
| Notched Izod impact strength | 5.8 kg · cm/cm |
| Shore D hardness | 90 |

EXAMPLE 2

The same procedures as in Example 1 were carried out with the following exceptions.

In the preparation of the second liquid resinous individual component (B), an individual sub-component (i) was prepared by mixing 30 parts by weight of the same polyetherpolyol compound mixture as that mentioned in Example 1 with 20 parts of the same polyepoxy compound as in Example 1, and another individual sub-component (ii) was prepared by mixing 50 parts by weight of the same polyetherpolyol mixture as in Example 1 with 0.90 part by weight of the same curing agent (N,N-dimethylbenzylamine) as in Example 1.

The first individual component (A) and the individual sub-components (i) and (ii) were stored separately from each other at room temperature for 60 days or more. No change in viscosity and appearance was found in each of the first individual component (A) and the individual sub-components (i) and (ii).

A liquid resinous mixture for molding was prepared by mixing 200 parts by weight of the first individual component (A) with 50 parts by weight of the individual sub-component (i) and 50 parts by weight of the individual sub-component (ii) by using a static mixing machine, and was then fed into a resin transfer molding (RTM) machine in which a mold was heated at a temperature of 140° C. After the liquid resinous mixture was pre-cured in the mold, the pre-cured shaped resin article was removed from the mold and then post-cured at a temperature of 180° C. for 4 hours.

The properties of the resultant shaped resin article were as follows.

| Flexural strength | 13.9 kg/mm$^2$ |
| --- | --- |
| Flexural modulus | 412 kg/mm$^2$ |
| Heat distortion temperature | 241° C. |
| Notched Izod impact strength | 5.9 kg · cm/cm |
| Shore D hardness | 90 |

EXAMPLE 3

The same procedures as in Example 1 were carried out with the following exceptions.

A first individual component (A) consisted of hexamethylene diisocyanate having an isocyanate equivalent amount of $11.90 \times 10^{-3}$ equivalents/g.

In preparation of a second individual component (B), an individual sub-component (i) was prepared by mixing 20 parts by weight of the same polyetherpolyol mixture as in Example 1 with 20 parts by weight of a polyepoxy compound available under the trademark of EPICOAT 815 from YUKA SHELL K.K. and having an epoxy equivalent amount of $5.26 \times 10^{-3}$ equivalents/g, and another individual sub-component (ii) was provided by mixing 40 parts by weight of the same polyetherpolyol mixture as in Example 1 with 0.6 part by weight of N,N-dimethylbenzyl amine (curing agent).

It was confirmed, by a storing test at room temperature for 60 days, that no change in viscosity and appearance occurred in each of the first individual component (A), and the individual sub-components (i) and (ii).

A liquid resinous mixture for molding was prepared by mixing 120 parts by weight of the first individual component (A) with 40 parts by weight of the individual sub-component (i) and 40 parts by weight of the individual sub-component (ii), and was then immediately fed into a mold in a RTM machine at a temperature of 140° C.

The pre-curing operation was carried out at the above-mentioned temperature for 15 minutes, and the pre-cured resin article was removed from the mold.

The pre-cured resin article was further cured at a temperature of 180° C. for 3 hours.

The test results of the cured article are as follows.

| Heat distortion temperature | 183° C. |
| --- | --- |
| Notched Izod impact strength | 6.6 kg · cm/cm |
| Shore D hardness | 88 |

EXAMPLE 4

The same procedures as in Example 1 were carried out with the following exceptions.

The first individual component (A) consisted of polyphenylenepolymethylenepolyisocyanate having an isocyanate equivalent amount of $6.82 \times 10^{-3}$ equivalents/g.

The second individual component (B) was prepared by mixing 125 parts by weight of a mixture of a plurality of polyetherpolyol compounds different in molecular weight from each other and having a total hydroxy-1 equivalent amount of $2.18 \times 10^{-3}$ equivalents/g with 25 parts by weight of the same polyepoxy compound (EPICOAT 828) as in Example 1 and 1.1 parts by weight of N,N-dimethylbenzyl amine (curing agent).

A liquid resinous mixture for molding was prepared by mixing 200 parts by weight of the first individual component (A) with 150 parts by weight of the second individual component (B), by using a static mixer.

The liquid resinous mixture was molded in a mold of a RTM machine at a temperature of 135° C. and pre-cured in the mold at the above-mentioned temperature for 30 minutes. The pre-cured resin article was removed from the mold and then further cured at a temperature of 200° C. for 3 hours.

The resultant product was a reddish brown colored transparent resin plate having a thickness of 3 mm.

The test results of the resin plate were as follows.

| Heat distortion temperature | 221° C. |
| --- | --- |
| Notched Izod impact strength | 5.2 kg · cm/cm |

EXAMPLE 5

The same procedures as in Example 1 were carried out with the following exceptions.

A first individual component (A) was the same as in Example 1.

A second individual component (B) was prepared by mixing 100 parts by weight of a mixture of a plurality of polyetherpolyol compounds different in molecular weight from each other and having a total hydroxyl equivalent amount of $3.15 \times 10^{-3}$ equivalents/g with 20 parts by weight of the same polyepoxy compound (EPICOAT 828) as in Example 1 and a curing agent consisting of 1.6 parts by weight of tetra-n-butylammonium bromide and 0.03 part by weight of dibutyltin dilaurate.

A liquid resinous mixture for molding was prepared by mixing 200 parts by weight of the first individual component (A) with 121 parts by weight of the second individual component (B) and molded in a mold by using an RTM machine at a temperature of 140° C.

The liquid resinous mixture in the mold was pre-cured at 140° C. for 30 minutes. The pre-cured resin article was removed from the mold and further cured at a temperature of 180° C. for 5 hours.

The resultant product was a reddish brown colored transparent resin plate having a thickness of 3 mm.

The test results of the resin plate were as follows.

| Flexural strength | 13.9 kg/mm$^2$ |
| --- | --- |
| Flexural modulus | 415 kg/mm$^2$ |
| Heat distortion temperature (HDT) | 236° C. |
| Notched Izod impact strength | 6.2 kg · cm/cm |
| Shore D hardness | 91 |

The first individual component (A) having an initial viscosity of 45 cps at 30° C. was stored at room temperature for 60 days. During the storage, no change in viscosity and appearance occurred.

Also, the second individual component (B) having an initial viscosity of 365 cps at 30° C. was stored at room temperature for 60 days. It was confirmed that no change in viscosity and appearance occurred in the second individual component (B) during the 60 days storage.

The stored first and second individual components (A) and (B) were subjected to the same molding process as mentioned above.

The resultant shaped resin article exhibited the same properties as mentioned above.

EXAMPLE 6

The same procedures as in Example 5 were carried out with the following exceptions.

A liquid resinous mixture was prepared by mixing 200 parts by weight of the first individual component (A) with 121 parts by weight of the second individual component (B) and poured into an aluminum cylinder having an inside diameter of 20 cm to a height of about 30 cm, by using an RTM machine. The bottom of the cylinder was formed by an aluminum plate and sealed by an adhesive.

The liquid resinous mixture in the cylinder was left to stand at room temperature. About 15 minutes after the standing, an exothermic reaction was started to cure the liquid resinous liquid. About one hour after the standing, the temperature of the outside surface of the cylinder was 92° C. at highest and the liquid resinous mixture was solidified.

The resultant article in the aluminum cylinder was placed in a hot air drier and pre-cured at a temperature of 140° C. for one hour, and then post-cured at a temperature of 180° C. for 5 hours. The cured article in the cylinder was cooled to room temperature and removed from the aluminum cylinder. The resultant cured product was a reddish brown colored transparent rod having a diameter of 20 cm and a length of 30 cm.

During the molding and curing procedures, the center portion of the rod was not scorched black, and thus the rod had a uniform quality. Also, no pores or voids were found in the rod.

The peripheral portion of the rod was easily shaved by a metal-cutting machine to reduce the diameter of the rod from 20 cm to 19.5 cm. Also, a hole having a diameter of 15 cm and a length of 10 cm was easily formed in the center portion of the rod, without breakage of the rod. The cut faces of the rod were smooth.

EXAMPLE 7

The same procedures as in Example 1 were carried out with the following exceptions.

The first individual component (A) was the same as in Example 1.

The second individual component (B) was prepared by mixing 100 parts by weight of a mixture of a plurality of polyetherpolyol compounds having a different molecular weight and having a total hydroxyl equivalent amount of $3.25 \times 10^{-3}$ equivalents/g, with 11 parts by weight of N,N,N',N'-tetraglycidylmethylene dianiline having an epoxy equivalent amount of $9.48 \times 10^{-3}$ equivalents/g and a curing agent consisting of 1.6 parts by weight of tetra-n-butylammonium bromide and 0.03 part by weight of dibutyltin dilaurate. The resultant second individual component (B) was slightly turbid. The degree of turbidity of the component (B), however, was not changed after a storage of over 60 days at room temperature. Also, no precipitate was formed in component (B). Further, no change in the viscosity of the component (B) occurred during the 60 days storage.

Also, it was confirmed that the 60 days storage at room temperature did not cause any change in the viscosity and appearance of the first individual component (A).

A liquid resinous mixture was prepared from 200 parts by weight of the first individual component (A) and 112 parts by weight of the second individual component (B), and molded in a mold at a temperature of 140° C. The pre-curing was carried out at the above-mentioned temperature for 30 minutes. The resultant pre-cured resin article was removed from the mold and post-cured at a temperature of 180° C. for 5 hours.

A resin plate having a thickness of 3 mm was obtained.

The test results of the resin plate are shown below.

| | |
|---|---|
| Flexural strength | 14.5 kg/mm² |
| Flexural modulus | 436 kg/mm² |
| Heat distortion temperature (HDT) | 258° C. |
| Notched Izod impact strength | 6.0 kg · cm/cm |

EXAMPLES 8 TO 10

In each of Examples 8 to 10, the same procedures as in Example 7 were carried out, except that the N,N,N',N'-tetraglycidylmethylene dianiline was replaced by the polyepoxy compound in the amount as indicated in Table 1, and the first and second individual components (A) and (B) were mixed in the amounts as shown in Table 1.

The test results of the cured resin plate are also shown in Table 1.

TABLE 1

| | | | | | Cured article | | | |
|---|---|---|---|---|---|---|---|---|
| | Polyepoxy compound | | | | Flexural | Flexural | | |
| Example No. | Type | | Amount (part by wt) | Mixing ratio Component (A)/ Component (B) | modulus (kg/mm²) | modulus (kg/mm²) | HDT (°C.) | Notched Izod impact strength (kg · cm/cm) |
| 8 | G\N-⬡-O-⬡-N/G with G(*)₁ | | 11.0 | 200/112 | 15.1 | 442 | 261 | 5.9 |
| 9 | G\N-⬡-SO₂-⬡-N/G | | 12.3 | 200/114 | 14.1 | 425 | 251 | 5.8 |

TABLE 1-continued

| Example No. | Polyepoxy compound Type | Amount (part by wt) | Mixing ratio Component (A)/ Component (B) | Cured article Flexural modulus (kg/mm²) | Flexural modulus (kg/mm²) | HDT (°C.) | Notched Izod impact strength (kg · cm/cm) |
|---|---|---|---|---|---|---|---|
| 10 | G−N(−G)−⟨⟩−S−⟨⟩−N(−G)−G | 11.5 | 200/113 | 14.0 | 433 | 247 | 5.8 |

Note: (*)₁G:
−CH₂−CH−CH₂
      \ /
       O

EXAMPLES 11 TO 13

In each of Examples 11 to 13, the same procedures as in Example 5 were carried out, with the following exceptions.

A plurality of reinforcing glass fiber cloths available under the trademark of GLASS CLOTH WF-230, N-100, from Nittobo K.K., and superimposed on each other in the amount as shown in Table 2 were placed in a mold for forming a plate-shaped composite resin article, provided with a cavity having a length of 30 cm, a width of 30 cm and a spacer thickness of 3 mm.

The first individual component (A) in an amount of 200 parts by weight and the second individual components (B) in an amount of 121 parts by weight were rapidly mixed with each other in a mixing head and the resultant liquid resinous mixture fed into the mold having an inlet for feeding the components (A) and (B) and an outlet for venting and discharging a resultant liquid resinous mixture, and containing the reinforcing glass fiber cloths under a reduced pressure of 150 mmHg while allowing the liquid resinous mixture to overflow from the outlet. When the overflow was initiated, the pressure in the mold was restored to the ambient atmospheric pressure.

When the overflow became free from bubbles, the feed of the liquid resinous mixture was stopped, and the liquid resinous mixture in the mold was pre-cured at a temperature of 140° C. for 30 minutes.

The pre-cured plate was then removed from the mold and further cured at a temperature of 180° C. for 5 hours.

The resultant product was a glass fiber-reinforced, light reddish brown colored resin plate.

The test results of the resin plate are shown in Table 2.

TABLE 2

| Item | Example No. 11 | 12 | 13 |
|---|---|---|---|
| Amount in volume of glass fiber cloth (V_f%) | 20 | 37 | 50 |
| Cured plate | | | |
| Flexural strength (kg/mm²) | 31 | 45 | 57 |
| Flexural modulus (kg/mm²) | 1040 | 1730 | 2650 |
| Notched Izod impact strength (kg · cm/cm) | 91 | 103 | 115 |
| HDT (°C.) | 245 | 285 | >300 |

The liquid resinous mixture exhibited a low viscosity at room temperature, and thus were able to easily penetrate the glass fiber cloths. Therefore, the liquid resinous mixture could be incorporated with a large amount of the reinforcing fiber material, and the resultant shaped product had significantly enhanced mechanical properties.

Separately, the same liquid mixture as mentioned above, containing a curing agent consisting of tetra-n-butyl ammonium bromide and dibutyltin dilaurate was subjected to a measurement of a total exotherm value in a curing reaction by using DSC (made by Du Pont, Type DSC-910) while raising the temperature of the mixture from 0° C. to 240° C. at a heating rate of 20° C./min.

The total exotherm value was 114 J/g. In comparison, a liquid resinous mixture consisting a polyepoxy compound (EPICOAT 828) and a isophorone diamine compound exhibited a total exotherm value of 504 J/g, under the same measurement procedure as mentioned above.

EXAMPLE 14

The same procedures as in Example 5 were carried out, with the following exceptions.

The second individual component (B) further contained 16 parts by weight of a liquid acrylonitrilebutadiene copolymer rubber provided with terminal hydroxyl groups and having a molecular weight of from 3,000 to 4,000.

The first individual component (A) in an amount of 200 parts by weight was mixed with 137 parts by weight of the second individual component (B). The resultant liquid resinous mixture was fed into a mold for forming a plate having a thickness of 3 mm at a temperature of 140° C.

The liquid resinous mixture was pre-cured in the mold at the above-mentioned temperature for 30 minutes, and then the pre-cured resin plate was removed from the mold and further cured at a temperature of 180° C. for 5 hours.

The test results of the cured plate are shown below.

| | |
|---|---|
| Flexural strength | 13.7 kg/mm² |
| Flexural modulus | 410 kg/mm² |
| Heat distortion temperature (HDT) | 230° C. |
| Notched Izod impact strength | 7.1 kg · cm/cm |
| Shore D hardness | 89 |

In view of the above test results, the cured plate exhibited an enhanced impact strength and satisfactory other properties.

EXAMPLE 15

The same procedures as in Example 7 were carried out with the following exceptions.

The first individual component (A) was the same as in Example 7.

The second individual component (B) was prepared by mixing 70 parts by weight of a mixture of a plurality of polyetherpolyol compounds having a different molecular weight and having a total hydroxyl equivalent amount of $4.20 \times 10^{-3}$ equivalents/g, with 10 parts by weight of the same epoxy compound as in Example 7, and a curing agent consisting of 1.4 parts by weight of tetra-n-butylammonium bromide and 0.042 part by weight of dibutyltin dilaurate. The resultant second individual component (B) was clear and not colored. No precipitate was formed in component (B) during storage for 60 days at room temperature. Further, no change in the viscosity of the component (B) occurred during the 60 days storage.

Also, it was confirmed that the 60 days storage at room temperature did not cause any change in the viscosity and appearance of the first individual component (A).

A liquid resinous mixture was prepared from 200 parts by weight of the first individual component (A) and 81 parts by weight of the second individual component (B), and molded in the same manner as in Example 7.

A resin plate having a thickness of 3 mm was obtained.

The test results of the resin plate are shown below.

| | |
|---|---|
| Heat distortion temperature (HDT) | 263° C. |
| Notched Izod impact strength | 6.6 kg · cm/cm |

EXAMPLE 16

The same procedures as in Example 7 were carried out with the following exceptions.

The first individual component (A) was the same as in Example 7.

The second individual component (B) was prepared by mixing 80 parts by weight of a mixture of a plurality of polyetherpolyol compounds having a different molecular weight and having a total hydroxyl equivalent amount of $3.80 \times 10^{-3}$ equivalents/g, with 10 parts by weight of the same epoxy compound as in Example 7 and a curing agent consisting of 1.4 parts by weight of tetra-n-butylammonium bromide and 0.042 part by weight of dibutyltin dilaurate. The resultant second individual component (B) was clear and not colored.

The 60 days storage at room temperature did not cause any change in the viscosity and appearance of the first individual component (A) and the second individual component (B).

A liquid resinous mixture was prepared from 200 parts by weight of the first individual component (A) and 91 parts by weight of the second individual component (B), and molded in the same manner as in Example 15.

The test results of the obtained resin plate are shown below.

| | |
|---|---|
| Heat distortion temperature (HDT) | 238° C. |
| Notched Izod impact strength | 6.9 kg · cm/cm |

EXAMPLE 17

The same procedures as in Example 1 were carried out with the following exceptions.

A first individual component (A) was the same as in Example 1.

A second individual component (B) was prepared by mixing 90 parts by weight of a mixture of a plurality of polyetherpolyol compounds different in molecular weight from each other and having a total hydroxyl equivalent amount of $3.15 \times 10^{-3}$ equivalents/g with 20 parts by weight of the same polyepoxy compound (EPICOAT 828) as in Example 1 and a curing agent consisting of 0.16 parts by weight of N,N-dimethyl-benzylamine, 1.5 parts by weight of tetra-n-butylammonium bromide and 0.03 part by weight of dibutyltin dilaurate.

A liquid resinous mixture for molding was prepared by mixing 200 parts by weight of the first individual component (A) with 111 parts by weight of the second individual component (B) and molded in a mold by using an RTM machine at a temperature of 140° C.

The liquid resinous mixture in the mold was pre-cured at 140° C. for 30 minutes. The pre-cured resin article was removed from the mold and further cured at a temperature of 180° C. for 5 hours.

The resultant product was a reddish brown colored transparent resin plate having a thickness of 3 mm.

The test results of the resin plate were as follows.

| | |
|---|---|
| Heat distortion temperature (HDT) | 238° C. |
| Notched Izod impact strength | 6.0 kg · cm/cm |

The first individual component (A) having an initial viscosity of 45 cps at 30° C. was stored at room temperature for 60 days. During the storage, no change in viscosity and appearance occurred.

At the initial stage, the resultant second liquid resinous individual component (B) had a viscosity of 365 cps at a temperature of 30° C.

After storage for 30 days at room temperature, the second liquid resinous individual component (B) exhibited a slightly increased viscosity of 395 cps at a temperature of 30° C.

The stored component (B) was in the state of a clear liquid and did not contain a precipitate or a gel-like substance.

It was confirmed that very little change in viscosity and appearance occurred in the second individual component (B) during the 30 days storage.

The stored first and second individual components (A) and (B) were subjected to the same molding process as mentioned above.

The resultant shaped resin article exhibited the same properties as mentioned above.

We claim:

1. A plural liquid pack-type heat-curable polyisocyanate-polyol-polyepoxy resin composition comprising:
   (A) a first individual component comprising (a) at least one polyisocyanate compound having two or more isocyanate groups;
   (B) a second individual component comprising (b) at least one polyol compound having two or more hydroxyl groups, (c) at least one polyepoxy compound having two or more epoxy groups, and (d) a curing agent, the hydroxyl groups of the polyol compound (d) in the second individual component (B) being present in an amount of 10 to 40 equivalents thereof per 100 equivalents of the isocyanate groups of the polyisocyanate compound (a) in the first individual component (A), the epoxy groups of the polyepoxy compound (c) in the second individual component (B) being present in an amount of 5 to 20 equivalents thereof per 100 isocyanate equivalents as mentioned above, the sum of the equivalent amount of the hydroxyl groups of the polyol compound (b) and the equivalent amount of the epoxy groups of the polyepoxy compound (c) in the second individual component (B) being present in the range of from 15 to 45 equivalents per 100 isocyanate equivalents as mentioned above, and the curing agent (d) in the second individual component (B) comprises at least one member selected from the group consisting of triethylamine, tripropylamine, tributylamine, triethylenediamine, N-methyl-morpholine, N,N'-dimethylpiperazine, N,N',N''-tris(dialkylaminoalkyl)hexahydro-S-triazine, triethylenemelamine, 1,4-di-azabicyclo-2,2,2-octane, N,N-dimethylbenzylamine, 2,4,6-tris(dimethylaminomethyl) phenol, N,N',N''-tris(dimethylaminopropyl) hexahydro-S-triazine, sodium methoxide, lead naphthenate, potassium-chelate compound of salicylaldehyde, and quaternary ammonium compounds of the formula (2):

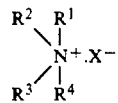

(2)

wherein $R^1$, $R^2$, $R^3$ and $R^4$ respectively and independently from each other represent a member selected from the group consisting of aliphatic hydrocarbon radicals having 1 to 20 carbon atoms, and cycloaliphatic and aromatic hydrocarbon radicals having 6 to 12 carbon atoms, the sum of the carbon atoms in the $R^1$, $R^2$, $R^3$ and $R^4$ groups being 12 or more, X represents a halogen atom.

2. The resin composition as claimed in claim 1, wherein the polyisocyanate compound (a) in the first individual component (A) is selected from the group consisting of hexamethylene diisocyanate, 2,2,4- and 2,4,4-trimethylhexamethylene-1,6-diisocyanates, isophorone-diisocyanate, 4,4'-dicyclohexylmethane diisocyanate, hydrogenated meta- and para-xylylene diisocyanates, 2,4- and 2,6-tolylene diisocyanates, 4,4'-diphenylmethane diisocyanate, 3,4'- and 4,4'-diphenylether diisocyanates, 1,5-naphthalene diisocyanate, meta- and para-xylylene diisocyanates, polyphenylenepolymethylene polyisocyanates, carbodiimide-modified and polyol-modified 4,4'-diphenylmethane diisocyanates, and terpolymers of diisocyanate compounds having at least one isocyanurate ring structure.

3. The resin composition as claimed in claim 1, wherein the polyol compound (b) in the second individual component (B) is selected from the group consisting of polyetherpolyol compounds, addition products of propylene glycol with ethylene oxide, addition products of a member selected from glycerol, pentaerythritol, sorbitol, trimethylolpropane, bisphenol A, and N-substituted diethanolamine with at least one member selected from ethylene oxide and propylene oxide, polyesterpolyol compounds, polycaprolactone polyol compounds, polycarbonate polyol compounds, polyetherpolyesterpolyol compounds, polyesterpolyamidepolyol compounds, alkylene glycols, hexane diols, glycerol, pentaerythritol, sorbitol, trimethylolpropane, N-mono-aromatic, cycloaliphatic and aliphatic radical-substituted diethanol amines, cyclohexane diols, cyclohexane dimethanols, bisphenol A, and modified polybutadiene, butadiene-styrene copolymers and butadiene-acrylonitrile copolymers each having two or more terminal hydroxyl radicals.

4. The resin composition as claimed in claim 1, wherein the polyepoxy compound (c) in the second individual component (B) is selected from bisphenol A diglycidylether, bisphenol F diglycidylether, bisphenol S diglycidylether, resorcinol diglycidylether, hexahydrobisphenol A diglycidylether, polypropylene-glycol diglycidylether, neopentylglycol diglycidylether, diglycidylphthalate, triglycidylisocyanurate compounds, phenol novolak polyglycidylethers, cresol novolak polyglycidylethers, and tetraglycidyl compounds of the formula (1):

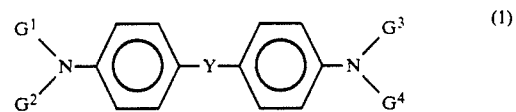

(1)

wherein Y represents a member selected from the group consisting of $-CH_2-$, $-C(CH_3)_2-$, $-O-$, $-SO_2-$, $-S-$, and $-C(CF_3)_2-$ radicals and $G^1$, $G^2$, $G^3$ and $G^4$ respectively and independently from each other represent a member selected from the group consisting of the radicals of the formulae:

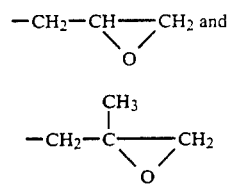

5. The resin composition as claimed in claim 1, wherein the curing agent (d) is present in an amount of 0.001 to 10 parts by weight based on 100 parts by total weight of the polyisocyanate compound (a), the polyol compound (b) and the polyepoxy compound (c).

6. The resin composition as claimed in claim 1, wherein the curing agent (d) comprises 0.3 to 3 parts by weight of at least one quaternary ammonium compound of the formula (2) and 0.001 to 0.25 parts by weight of at least one tin compound selected from tin (II) chloride, tin (IV) chloride, di-n-butyl tin dilaurate, di-n-butyl tin acetate, tributyl tin acetate, and tetra-n-butyl tin, per 100 parts by the total weight of the polyisocyanate compound, the polyol compound and the polyepoxy compound.

7. The resin composition as claimed in claim 1, wherein in the second individual component (B), the polyol compound (b), the polyepoxy compound (c) and the curing agent (d) are uniformly mixed altogether.

8. The resin composition as claimed in claim 1, wherein the second individual components (B) is composed of (i) an individual sub-component comprising a mixture of a portion of the polyol compound (b) with the polyepoxy compound (c) and (ii) another individual sub-component comprising a mixture of the remaining portion of the polyol compound (b) with the curing agent (d).

9. A process for producing a shaped resinous article from the plural liquid pack-type, heat curable polyisocyanate-polyol-polyepoxy resin composition as claimed in claim 1 comprising the steps of:

mixing the first individual component (A) with the second individual component (B) to provide a liquid mixture;

immediately feeding the liquid mixture into a mold;

heat-curing the liquid mixture in the mold; and taking out the resultant shaped resinous article from the mold.

10. The process as claimed in claim 9, wherein the liquid mixture is heat-cured at a temperature of from about 10° C. to about 280° C., and at least one stage of the heat-curing step, the heat-curing temperature is at a level of 150° C. or more.

11. The process as claimed in claim 9, wherein the liquid resinous mixture in the mold is pre-heat-cured at a temperature of lower than 150° C. and the pre-heat cured article is taken out of the mold and post-heat cured at a temperature of 150° C. to 280° C.

12. The process as claimed in claim 9, wherein the heat-curing step is carried out in an inert gas atmosphere.

13. The process as claimed in claim 9, wherein the second individual component (B) is composed of (i) a individual sub-component comprising a mixture of a portion of the polyol compound (b) with the polyepoxy compound (c) and (ii) a individual sub-component comprising a mixture of the remaining portion of the polyol compound (b) and the curing agent (d).

14. The process as claimed in claim 13, wherein in the mixing step, the individual sub-components (i) and (ii) are mixed with each other, and the resultant mixture is further mixed with the first individual component (A).

* * * * *